(12) United States Patent
Moreton et al.

(10) Patent No.: US 6,900,810 B1
(45) Date of Patent: May 31, 2005

(54) USER PROGRAMMABLE GEOMETRY ENGINE

(75) Inventors: Henry P. Moreton, Woodside, CA (US); Dominic Acocella, Blainville (CA); Justin Scott Legakis, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 10/727,822

(22) Filed: Dec. 3, 2003

Related U.S. Application Data
(60) Provisional application No. 60/462,484, filed on Apr. 10, 2003.

(51) Int. Cl.[7] .................................................. G06T 1/00
(52) U.S. Cl. ........................................ 345/522; 345/506
(58) Field of Search ................................ 345/501–503, 345/505, 506, 522, 418, 423–427

(56) References Cited

U.S. PATENT DOCUMENTS

| | | | |
|---|---|---|---|
| 6,003,098 A | * 12/1999 | Krech, Jr. ................... | 345/503 |
| 6,469,704 B1 | * 10/2002 | Johnson ..................... | 345/522 |
| 6,532,009 B1 | * 3/2003 | Fox et al. .................. | 345/419 |
| 6,650,327 B1 | * 11/2003 | Airey et al. ................ | 345/422 |
| 6,664,971 B1 | * 12/2003 | Mukherjee et al. ......... | 345/582 |
| 6,704,018 B1 | * 3/2004 | Mori et al. ................. | 345/502 |

OTHER PUBLICATIONS

Catmull, E., et al., "Recursively generated B–spline surfaces on arbitrary topological meshes," Computer Aided Design, vol. 10, pp. 350–355, 1978.

Halstead, Mark, et al., "Efficient, Fair Interpolation using Catmull–Clark Surfaces," Computer Graphics (SIGGRAPH Proceedings), pp. 35–44, 1993.

Havemann, Sven, "Interactive Rendering of Catmull/Clark Surfaces with Crease Edges," Computer Graphics, TU Braunschweig, Feb. 2001.

King, Davis et al., "An Architecture for Interactive Tetrahedral Volume Rendering," HP Laboratories Palo Alto, HPL–2000–121 (R.3), Aug. 2, 2001.

Lindholm, et al., "A User–Programmable Vertex Engine," ACM SIGGRAPH 2001, pp. 149–158, Aug. 2001.

Moreton, Henry, "Watertight Tessellation using Forward Differencing," Siggraph/Europgraphics Workshop on Graphics Hardware, pp. 25–32, 2001.

* cited by examiner

*Primary Examiner*—Kee M. Tung
(74) *Attorney, Agent, or Firm*—Moser Patterson & Sheridan LLP

(57) ABSTRACT

A programmable geometry engine is described. One embodiment of the programmable geometry engine includes a programmable primitive engine configured to receive primitive commands that include information for processing vertex data using user-developed programs or subroutines. The programmable primitive engine also is configured to transmit program commands that include program pointers and data pointers. In addition, the programmable geometry engine includes a processing engine configured to receive the program commands. The processing engine is further configured to retrieve the user-developed programs or subroutines using the program pointers and to retrieve vertex data using the data pointers. Also, the processing engine is configured to process the vertex data based on instructions included in the user-developed programs or subroutines to produce processed vertex data and to transmit results to the programmable primitive engine.

25 Claims, 7 Drawing Sheets

USER PROGRAMMABLE GEOMETRY ENGINE

CROSS-REFERENCE TO RELATED APPLICATION(S)

This application relates to, and claims the priority benefit of, U.S. Provisional Patent Application No. 60/462,484, titled "User Programmable Primitive Engine," filed on Apr. 10, 2003. The subject matter of this related application is hereby incorporated by reference.

This application also relates to application No. Ser. No. 10/727,679, titled "Neighbor and Edge Indexing," filed on Dec. 4, 2003. The subject matter of this related application also is hereby incorporated by reference.

FIELD OF THE INVENTION

The present invention generally relates to graphics processing and more specifically to a user programmable geometry engine.

BACKGROUND

FIG. 1 is a block diagram illustrating a prior art graphics pipeline 100 as set forth in OpenGL, a well-known graphics application programming interface ("API"). Persons skilled in the art will recognize that FIG. 1 depicts only the logical relationships among the various elements of graphics pipeline 100 and does not necessarily show a hardware implementation of graphics pipeline 100.

As shown, imaging path 102 receives image data 104. Image data 104 is processed to have pixels unpacked at 106. Geometry path 112 receives geometry data 114, namely, geometry primitives. At 116, vertices of geometry data 114 are unpacked. Unpacking of pixels at 106 and unpacking of vertices at 116 are both performed in partial response to display lists 122 input into imaging path 102 and geometry path 112, respectively. Persons skilled in the art will appreciate that conventional user programming in geometry path 112 is based on the stream of unpacked vertices provided to vertex operations 118. Further, evaluators 117 are located in front of vertex operations 118. Tessellation therefore occurs before vertex operations 118 in this particular configuration of graphics pipeline 100.

As FIG. 1 also shows, at 108, pixel operations are performed on unpacked pixels 106. At 118, vertex operations are performed on unpacked vertices 116. Texture data or texels generated from pixel operations 108 are stored in texture memory 124. At 110, image rasterization is done on pixel data following pixel operations 108. Texture data as well as geometry data produced from vertex operations 118 are rasterized with geometric rasterization at 120. Image rasterization 110 and geometric rasterization 120 outputs are combined and processed by fragment operations 126, the output of which is provided to frame buffer 128.

Graphics processors that implement the functionality of graphics pipelines, such as graphics pipeline 100, may have user-programming capability, but such programmability typically is limited to vertex-oriented processing. For example, graphics processors with user-programmability may include one or more processing units, such as vertex engines, that are capable of processing a stream of vertices using various user-developed programs or subroutines. By providing such a programmable vertex engine, the flexibility and functionality of the graphics processor is enhanced. However, a graphics processor with this type of programmable vertex engine limits a user to influencing only how vertex data is manipulated. A more flexible graphics processor would also enable a user to influence how primitives are manipulated in the graphics pipeline.

In addition to the foregoing, in current architectures such as that depicted in graphics pipeline 100, evaluation usually is performed prior to performing many vertex operations such as matrix palette skinning. As is commonly known, an evaluator is used in a graphics pipeline for a variety of functions such as computing geometry defined by bi-variate polynomials and tessellating such geometry. A specific problem with this order of operations is that when a vertex program operates on one of the vertices of a triangle during matrix palette skinning, the vertex program typically selects a subset of matrices and weights from a predefined set of matrices configured for skinning operations and performs the necessary weighted transforms. If, however, that triangle derives from a patch, the vertices of the triangle have no immediately obvious matrices or weights, thereby defeating matrix palette skinning. A more feasible approach would be to apply the skinning operations to the control points of the patch and then tessellate. The current architecture, however precludes such an approach. Further, to achieve this same effect in the current architecture all matrices affecting the control points of a patch must influence the final position of the evaluated positions. As all relevant operations are linear, this means that all of the active matrices have to be interpolated and applied to the evaluated positions. This requires the union of all active matrices to be included in the relevant operations, resulting in a far larger number of matrices being applied to each generated vertex, thereby making these skinning calculations largely impractical.

Another limitation of the current architecture pertains to load balancing. In a typical configuration, dedicated, statically portioned hardware units perform the various operations in the graphics pipeline such as evaluation and transform and lighting computations. Further, to the extent that one of these units has a disproportionately greater number of operations to perform, the current architecture has no way of offloading any of those calculations to other operational units in the graphics processor. As a result, one or more such units may act as a bottleneck in the graphics pipeline.

SUMMARY

One embodiment of a programmable geometry engine includes a programmable primitive engine configured to receive primitive commands that include information for processing vertex data using user-developed programs or subroutines. The programmable primitive engine also is configured to transmit program commands that include program pointers and data pointers. In addition, the programmable geometry engine includes a processing engine configured to receive the program commands. The processing engine is further configured to retrieve the user-developed programs or subroutines using the program pointers and to retrieve vertex data using the data pointers. Also, the processing engine is configured to process the vertex data based on instructions included in the user-developed programs or subroutines to produce processed vertex data and to transmit results to the programmable primitive engine.

One advantage of the disclosed programmable geometry engine is that it may be configured to implement specific user-programmed functions. This functionality provides users with the ability to influence a variety of computational parameters and metrics that determine how a graphics processor actually generates primitives in the graphics pipeline. Another advantage is that the disclosed programmable geometry engine has the flexibility to perform vertex operations before and/or after primitive operations. Such flexibility in the architecture enables matrix palette skinning to be performed after tessellation, if so desired. In addition, the programmable geometry engine may include multiple fixed function engines and a scheduler, which arbitrates access to one or more processing engines among the different fixed function engines. The scheduler may be configured to load balance among the different fixed function engines by allowing a fixed function engine with greater processing needs to transmit program commands to the processing engine(s) more frequently than those fixed function engines requiring less processing support. Such load balancing may reduce bottlenecks in the graphics pipeline.

DETAILED DESCRIPTION

Figure 2:
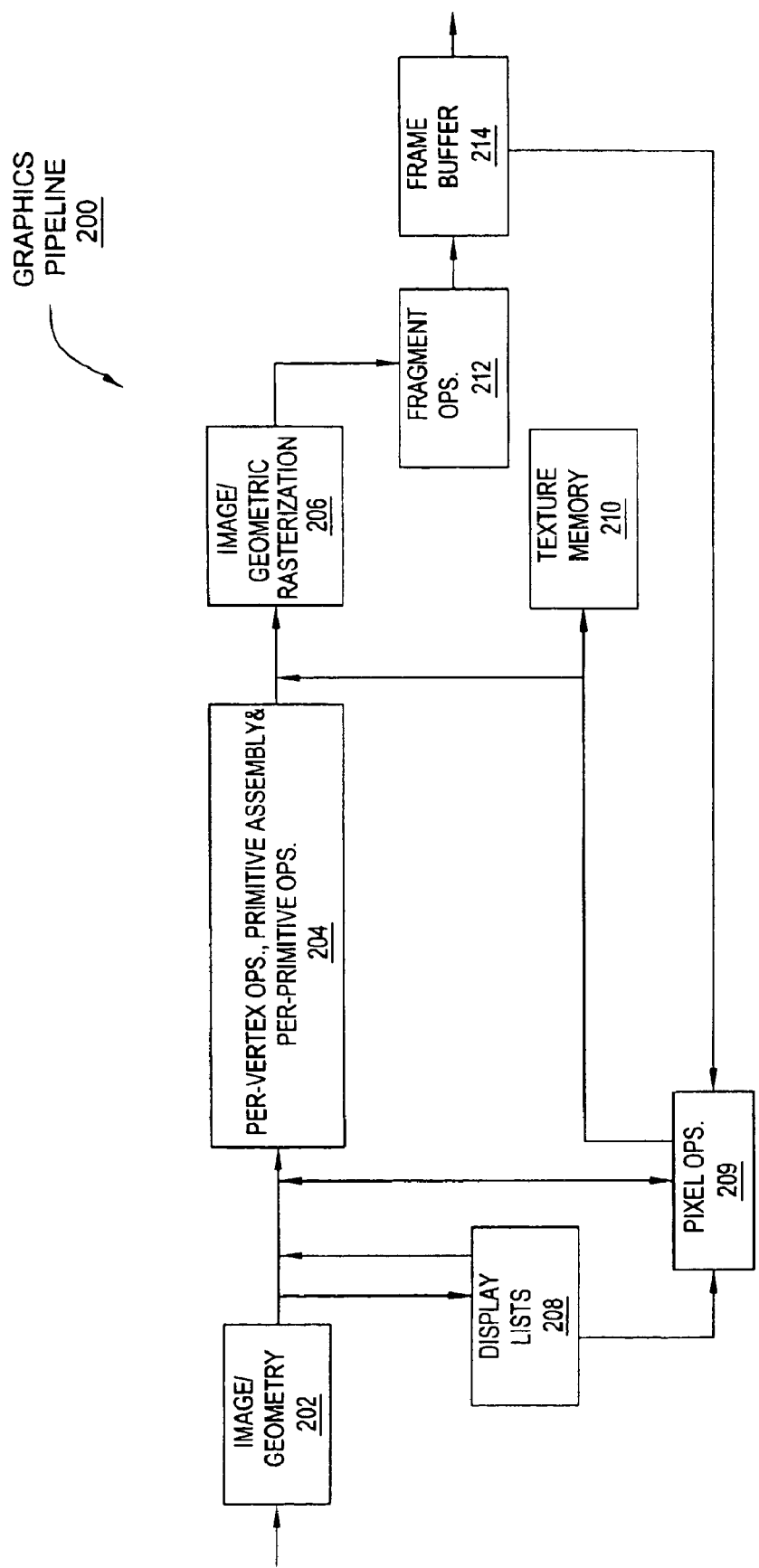
FIG. 2 is a block diagram of a graphics pipeline, according to one embodiment of the invention.

FIG. 2 is a block diagram of a graphics pipeline 200, according to one embodiment of the invention. Persons skilled in the art will recognize that FIG. 2 depicts only the logical relationships among the various elements of graphics pipeline 200 and does not necessarily show a hardware implementation of graphics pipeline 200.

As shown, graphics pipeline 200 includes a programmable geometry engine 204, which is configured for per-vertex operations, primitive assembly and per-primitive operations. The functionality of programmable geometry engine 204 includes both programmable vertex processing and programmable primitive processing. As described in further detail below in conjunction with FIG. 4, programmable primitive processing is provided by combining various functional engines, such as a subdivision engine or a mesh engine (otherwise referred to as a "tessellation engine" or an "evaluator"), with one or more vertex engines. Notably, the functional engines are configured to cause the one or more vertex engines to execute various user-developed programs or subroutines for various primitive processing operations. As described in further detail herein, this functionality, among other things, enables users to influence a variety of computational parameters and metrics that determine how a graphics processor (which would include programmable geometry engine 204) actually generates primitives in graphics pipeline 200.

Figure 1:
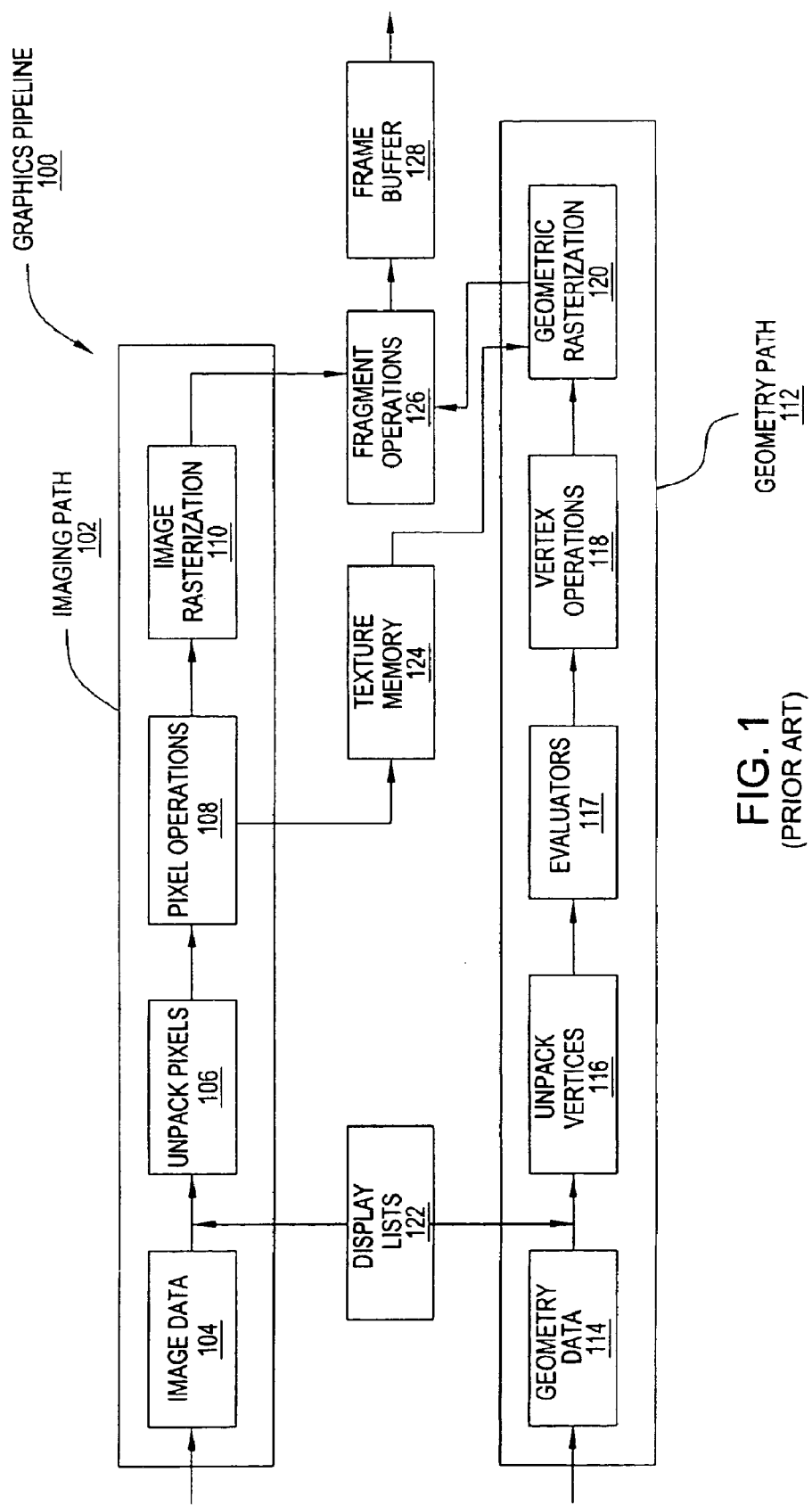
FIG. 1 is a block diagram illustrating a prior art graphics pipeline as set forth in OpenGL, a well-known graphics application programming interface.

As FIG. 2 also shows, image and geometry data 202 are provided to programmable geometry engine 204 and display lists 208. In one embodiment, image and geometry data 202 is equivalent to image data 104 and geometry data 114 of FIG. 1, and display lists 208 is equivalent to display lists 122 of FIG. 1. In response, display lists 208 provides display listed or indexed image and geometry data to programmable geometry engine 204 and pixel operations 209. In one embodiment, pixel operations 209 is equivalent to pixel operations 108 of FIG. 1. In response to receiving indexed image and geometry data, pixel operations 209 output pixels to texture memory 210 and image and geometric rasterization 206, and programmable geometry engine 204 outputs primitives to image and geometric rasterization 206. In one embodiment, texture memory 210 is equivalent to texture memory 124 of FIG. 1, and image and geometric rasterization 206 is equivalent to image rasterization 110 and geometric rasterization 120. Output from image and geometric rasterization 206 is provided to fragment operations 212, and output of fragment operations 212 is provided to frame buffer 214. Frame buffer 214 may be accessed for image generation as well a for feed back to pixel operations 209. In one embodiment, fragment operations 212 is equivalent to fragment operations 126 of FIG. 1, and frame buffer 214 is equivalent to frame buffer 128 of FIG. 1.

Figure 3:
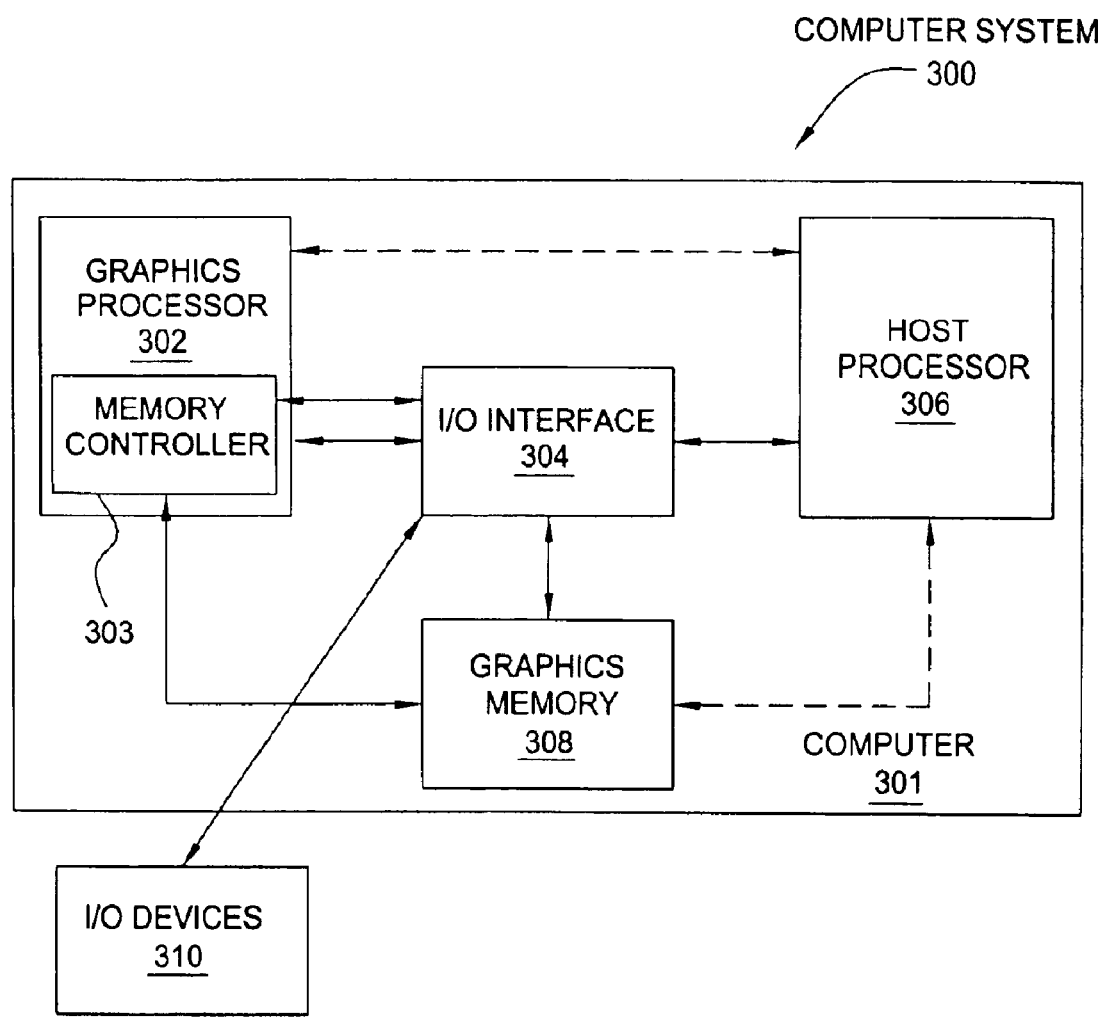
FIG. 3 is a block diagram illustrating a computer system, according to one embodiment of the invention.

FIG. 3 is a block diagram illustrating a computer system 300, according to one embodiment of the invention. As shown, computer system 300 may include, without limitation, a computer 301 and input/output devices 310. Computer system 300 may be a desktop computer, server, laptop computer, palm-sized computer, personal digital assistant, tablet computer, game console, cellular telephone, computer-based simulator or any other type of similar computing device.

Computer 301 may include, without limitation, a graphics processor 302, an input/output interface 304, a host processor 306 and a graphics memory 308. Graphics processor 302 includes memory controller 303, which arbitrates access to graphics memory 308 among the various operational elements of graphics processor 302. Memory controller 303 may be coupled directly to graphics memory 308 or may be coupled indirectly to graphics memory 308 through an input/output interface 304. As persons skilled in the art will understand, graphics processor 302 may be configured to perform some or all of the operations of the logical elements of graphics pipeline 200 of FIG. 2.

Input/output devices 310 are coupled to graphics processor 302 through input/output interface 304. In one embodiment, graphics processor 302 is coupled to host processor 306 through input/output interface 304. In an alternative embodiment, graphics processor 302 may be coupled directly to host processor 306. Similarly, in one embodiment, graphics memory 308 is coupled to host processor 306 through input/output interface 304, but, in an alternative embodiment, graphics memory 308 may be coupled directly to host processor 306.

Graphics memory 308 may be any memory used to store graphics data or program instructions to be executed by graphics processor 302. For example, graphics memory 308 may include portions of system memory, local memory directly coupled to graphics processor 302 or register files coupled to the computational units within graphics processor 302.

Figure 4:
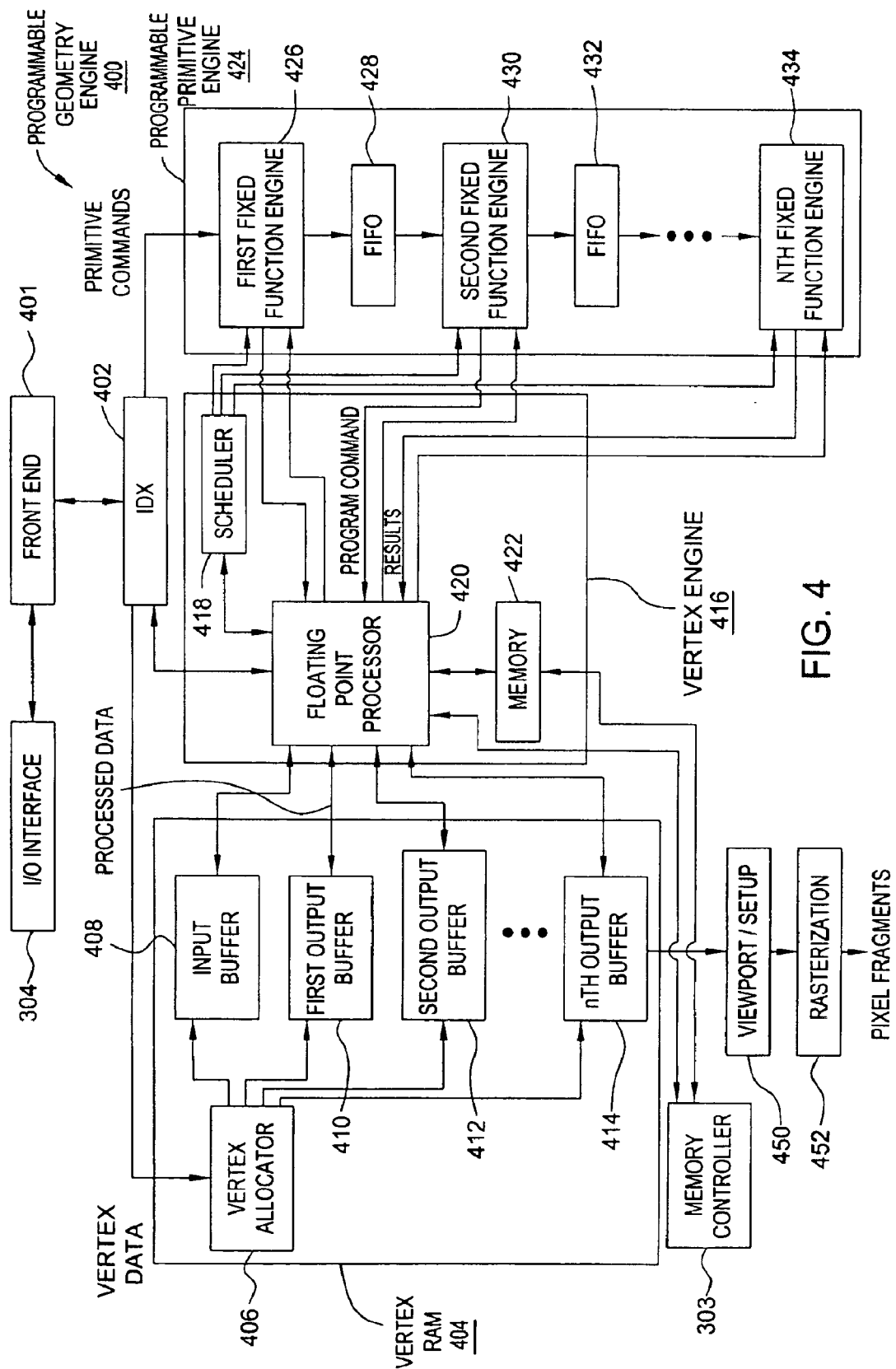
FIG. 4 is a functional block diagram of a programmable geometry engine, according to one embodiment of the invention.

FIG. 4 is a functional block diagram of a programmable geometry engine 400, according to one embodiment of the invention. As shown, programmable geometry engine 400 may include, without limitation, an indexed primitive processor ("IDX") 402, a vertex random access memory ("vertex RAM") 404, a vertex engine 416 and a programmable primitive engine 424. As described in further detail herein, programmable primitive engine 424 is generally configured to include any number of fixed function engines that are responsible for processing the primitive commands that DX 402 transmits to programmable primitive engine 424. The fixed function engines are configured to convert the transmitted primitive commands into program commands and to transmit the program commands to vertex engine 416 for processing. Vertex engine 416 retrieves various user-developed primitive programs or subroutines from graphics memory 308 using pointers to those programs or subroutines included in the program commands. The user-developed programs or subroutines contain instructions that, for example, may configure vertex engine 416 to perform specific operations on vertex data stored in vertex RAM 404, producing various computational parameters and metrics that determine how a graphics processor actually generates primitives in the graphics pipeline as well as processed vertex data. A fixed function engine within programmable primitive engine 424 also may be configured to generate separate primitives or groups of primitives, such as cube strips, tetrahedron strips, triangle strips, quad strips, triangle fans, quad fans and the like, using the vertex data stored in vertex RAM 404. In one embodiment, programmable geometry engine 400 resides within graphics processor 302 of FIG. 3.

More specifically, IDX 402 is coupled to a front end 401, which is coupled to input/output interface 304. As described above in conjunction with FIG. 3, input/output interface 304 is coupled to graphics memory 308 (not shown). IDX 402 is configured to access vertex data and related primitive commands from graphics memory 308 via front end 401 and input/output interface 304. IDX 402 is further configured to transmit those vertex data and primitive commands to vertex RAM 404 and programmable primitive engine 424, respectively. Vertex data may include any graphics data associated with a given vertex and may also include any graphics information associated with the neighbors of that vertex. Examples of vertex data include, without limitation, position, texture coordinates, color, luminance, alpha (i.e., transparency) and the like as well as index information for vertices and their neighbors. Primitive commands may include any information related to primitive processing such as pointers to user-developed primitive programs or subroutines stored in graphics memory 308, index information for the vertices of the primitives processed using those user-developed primitive programs or subroutines, index information for the neighbors of those vertices, processing instructions and the like.

Programmable primitive engine 424 may include, without limitation, any number of fixed function engines as represented by a first fixed function engine 426, a second fixed function, engine 430 and continuing up to and including an Nth fixed function engine 434. Each of first fixed function engine 426, second fixed function engine 430 and Nth fixed function engine 434 may be configured to process an original primitive such as a cube strip, a tetrahedron strip, a triangle strip, a quad strip, a triangle fan, a quad fan, a triangle, a quad, a line, and point and the like or to arbitrarily generate primitives of a single type. Further, as described in further detail herein, first fixed function engine 426, second fixed function engine 430 and Nth fixed function engine 434 are configured to enable programmable geometry engine 400 to implement specific user-programmed functions for various primitive processing operations such as, for example, processing vertex data, generating individual primitives, subdividing primitives, generating meshes of primitives and the like. As persons skilled in the art will understand, each of first fixed function engine 426, second fixed function engine 430 and Nth fixed function engine 434 has the same general configuration. For this reason, the configuration of only first fixed function engine 426 is described herein.

In one embodiment, first fixed function engine 426 is configured to receive primitive commands transmitted by IDX 402. First fixed function engine 426 is further configured to determine whether any of the received primitive commands relate to it—meaning that first fixed function engine 426 determines whether it is supposed to process any of the received primitive commands (each primitive command that relates to first fixed function engine 426 is hereinafter referred to as a "related primitive command").

For example, in one embodiment, each primitive command transmitted by IDX 402 includes one or more flags, each flag corresponding to a different fixed function engine in programmable primitive engine 424. If a given fixed function engine (e.g., first fixed function engine 426) is supposed to process a particular primitive command, then the flag in that primitive command corresponding to the given fixed function engine is enabled. By contrast, if the given fixed function engine is not supposed to process the particular primitive command, then the flag in the primitive command corresponding to the given fixed function engine is disabled. In such an embodiment, each fixed function engine in programmable primitive engine 424 is configured to read the flags included in a primitive command transmitted by IDX 402 to determine whether to process that primitive command.

In an alternative embodiment, each fixed function engine in programmable primitive engine 424 may be configured with one or more internal flags, each flag corresponding to a different primitive type (e.g., triangle, line, point and the like). A given fixed function engine may further be configured such that if a particular flag within the fixed function engine is enabled, then that fixed function engine processes all primitive commands related to the primitive type corresponding to the enabled flag. Similarly, the fixed function engine may be configured such that if a particular flag is disabled, then the fixed function engine does not process (and simply passes through) all primitive commands related to the primitive type corresponding to the disabled flag. In another alternative embodiment, a given fixed function engine may be configured with one or more enabled internal flags, each flag corresponding to a different primitive type that the fixed function engine is configured to process. In such a configuration, the fixed function engine is configured not to process (and simply to pass through) any primitive command that is not related to a primitive type corresponding to the one or more enabled flags. In yet another alternative embodiment, a given fixed function engine may be configured to process all primitive commands corresponding to a particular primitive type. In such an embodiment, the fixed function engine is configured not to process (and simply to pass through) any primitive command that is not related to the primitive type that the fixed function engine is configured to process.

If first fixed function engine 426 determines that none of the received primitive commands are related primitive commands, then first fixed function engine 426 is configured to transmit the primitive commands to the next fixed function engine in programmable primitive engine 424. As FIG. 4 shows, the second fixed function engine 430 is the next fixed function engine in programmable primitive engine 424. If, however, first fixed function engine 426 determines that at least one of the received primitive commands is a related primitive command, then first fixed function engine 426 is configured to wait to receive a complete set of such related primitive commands before processing any of the related primitive command (the group of related primitive commands is hereinafter referred to as the "set of related primitive commands").

In one embodiment, first fixed function engine 426 is configured to determine whether it has received the complete set of related primitive commands by attempting to assemble a primitive using the vertex index information contained in the related primitive commands that have been already received. As persons skilled in the art will understand, being able to assemble a primitive confirms that the information for each vertex of that primitive has been received. If first fixed function engine 426 is able to assemble a primitive, then first fixed function engine 426 has received the complete set of related primitive commands. If first fixed function engine 426 is not able to assemble a primitive, then first fixed function engine 426 has not yet received the complete set of related primitive commands. In the latter case, first fixed function engine 426 is configured to wait to receive additional related primitive commands and to attempt to assemble a primitive again. First fixed function engine 426 is further configured to repeat the process of waiting for additional related primitive commands and attempting to assemble a primitive until first fixed function engine 426 is able to assemble a primitive (thereby indicating that first fixed function engine 426 has received the complete set of related primitive commands).

Once the complete set of related primitive commands has been received, first fixed function engine 426 is configured to identify a first primitive command in the set of related primitive commands to be processed. First fixed function engine 426 is configured to generate a program command corresponding to this first primitive command and to transmit the program command to vertex engine 416 for processing. The program command contains all information necessary for vertex engine 416 to carry out the computations specified by the first primitive command. For example, the program command may include, without limitation, a pointer to the user-developed program or subroutine that vertex engine 416 is to execute (also referred to as a "program pointer"), one or more pointers to vertex data on which vertex engine 416 is to perform specific operations, including index information for the vertices of the primitive that first fixed function engine 426 is processing and/or index information for the neighbors of those vertices (also referred to as a "data pointer"), u, v, w interpolation weights and the like.

As described in further detail herein, vertex engine 416 is configured to process the program command and to return the corresponding results to first fixed function engine 426. These results may be any type of state information related to the type of user-programmed function that first fixed function engine 426 is configured to implement. Results may include, for example, level of detail ("LOD") or edge test calculations, computed vertices, vector products, sign data, comparison results, mesh densities and the like.

First fixed function engine 426 is configured to determine whether to wait until vertex engine 416 processes the program command and returns the corresponding results before transmitting another program command to vertex engine 416. First fixed function engine 426 may make this determination from, for example, instructions included in the primitive command or program command currently being processed or from information included in results received from vertex engine 416 that correspond to a previously processed program command.

Upon determining not to wait for vertex engine 416 to return the corresponding results, first fixed function engine 426 is configured to determine whether to transmit the same program command again to vertex engine 416 for processing. However, upon determining to wait, first fixed function engine 426 is configured instead to wait to receive the corresponding results from vertex engine 416 and to interpret those results once they are received. First fixed function engine 426 is configured then to determine whether to transmit the same program command again to vertex engine 416 for processing. First fixed function engine 426 may make this determination from, for example, instructions included in the primitive command or program command currently being processed or from information included in results received from vertex engine 416 that correspond to a previously processed program command.

Upon determining to transmit the same program command again to vertex engine 416 for processing, first fixed function engine 426 is configured to resend the program command to vertex engine 416. However, upon determining not to transmit the same program command again, first fixed function engine 426 is configured instead to determine whether all of the primitive commands in the set of related primitive commands have been processed.

Upon determining that one or more primitive commands in the set of related primitive commands remain unprocessed, first fixed function engine 426 is configured to identify the next primitive command in the set of related primitive commands to be processed. First fixed function engine 426 is configured to process this next primitive command in the same manner as described above in conjunction with the first primitive command. More generally, first fixed function engine 426 is configured to process each primitive command in the set of related primitive commands in the manner described above in conjunction with the first primitive command until all primitive commands in the set of related primitive commands have been processed.

However, upon determining that all primitive commands in the set of related primitive commands have been processed, first fixed function engine 426 is configured instead to transmit the primitive commands received from IDX 402 that remain unprocessed to the next fixed function engine in programmable primitive engine 424. The next fixed function engine, second fixed function engine 430 in the embodiment of FIG. 4, is configured to process all of the primitive commands received from IDX 402 pertaining to it as described herein with respect to first fixed function engine 426. After processing all such primitive commands, second fixed function engine 430 is configured to transmit the unprocessed primitive commands received from IDX 402 to the next fixed function engine in programmable primitive engine 424. The fixed function engines in programmable primitive engine 424 are configured to follow this general procedure described herein until all of the primitive commands received from IDX 402 have been processed.

Persons skilled in the art will understand that first fixed function engine 426 may be configured to transmit program commands to vertex engine 416 and to receive and interpret corresponding results in any technically feasible manner. Persons skilled in the art therefore will recognize, for example, that neither the way that first fixed function engine 426 determines whether to wait for vertex engine 416 to return results before sending another program command to vertex engine 416 for processing nor the way that first fixed function engine 426 determines whether to resend a given program command to vertex engine 416 for processing in any way limits the scope of the present invention.

One should further note that, as described herein, a given fixed function engine may be configured to generate primitives with their own topologies, as opposed to being configured to process previously generated primitives. In such a configuration, the fixed function engine may output, among other things, index information for the vertices of the generated primitives, index information for the neighbors of those vertices, processing instructions and the like. The fixed function engine may be further configured to transmit this output, constituting one or more additional unprocessed primitive commands, to the next fixed function engine in programmable primitive engine 424, as previously described herein with respect to the primitive commands transmitted by IDX 402.

Programmable primitive engine 424 also may include one or more memory caches as represented by a first-in-first-out memory ("FIFO") 428 and a FIFO 432. As FIG. 4 shows, FIFO 428 is coupled to first fixed function engine 426 and second fixed function engine 430, and FIFO 432 is coupled to second fixed function engine 430 and the next fixed function engine (not shown) in programmable primitive engine 424. FIFO 428 is configured to store unprocessed primitive commands transmitted by first fixed function engine 426 (including those generated by first fixed function engine 426) to second fixed function engine 430. FIFO 432 is configured to store unprocessed primitive programs transmitted by second fixed function engine 430 (including those generated by second fixed function engine 430) to the next fixed function engine in programmable primitive engine 424. In such an embodiment, second fixed function engine 430 is configured to access any unprocessed primitive commands stored in FIFO 428, and the next fixed function engine in programmable primitive engine 424 following second fixed function engine 430 is configured to access any unprocessed primitive commands stored in FIFO 432. Persons skilled in the art will understand that in alternative embodiments, programmable primitive engine 424 may not include FIFO 428 and/or FIFO 432. In these embodiments, first fixed function engine 426 transmits all unprocessed primitive commands directly to second fixed function engine 430 and/or second fixed function engine 430 transmits. all unprocessed primitive commands directly to the next fixed function engine in programmable primitive engine 424.

Persons skilled in the art will understand that each fixed function engine included in programmable primitive engine 424 may be configured to cause the implementation of any type of user-programmed function. Programmable primitive engine 424 therefore may be configured to cause the implementation of any desired combination of user-programmed functions. For example, programmable primitive engine 424 may be configured such that first fixed function engine 426 and second fixed function engine 430 cause the implementation of the same user-programmed function, and Nth fixed function engine 434 causes the implementation of a different user-programmed function. Alternatively, programmable primitive engine 424 may be configured such that each of first fixed function engine 426, second fixed function engine 430 and Nth fixed function engine 434 either causes the implementation of the same user-programmed function or causes the implementation of a different user-programmed function. In yet other alternative embodiments, programmable primitive engine 424 may be configured such that at least one other fixed function engine causes the implementation of the same user-programmed function as first fixed function engine 426, second fixed function engine 430 and/or Nth fixed function engine 434. In addition, persons skilled in the art will appreciate that, in alternative embodiments, any given fixed function engine configured to cause the implementation of one type of user-programmed function may be reconfigured to cause the implementation of another type of user-programmed function.

In one embodiment, first fixed function engine 426, second fixed function engine 430 and Nth fixed function engine 434 are configured as state machines. In alternative embodiments, first fixed function engine 426, second fixed function engine 430 and Nth fixed function engine 434 may be configured in any other technically feasible way so long as each of first fixed function engine 426, second fixed function engine 430 and Nth fixed function engine 434 functions as intended. Finally, the functionality of first fixed function engine 426, second fixed function engine 430 and Nth fixed function engine 434 may be implemented in hardware and/or software.

Vertex RAM 404 is configured to store and to manage access to vertex data received from IDX 402 as well as processed vertex data received from vertex engine 416. Vertex RAM 404 may be any other type of storage resource such as, for example, a cache or a register file. As shown, vertex RAM 404 may include, without limitation, a vertex allocator 406, an input buffer 408 and any number of output buffers as represented by a first output buffer 410, a second output buffer 412 and continuing up to and including an nth output buffer 414. In one embodiment, vertex allocator 406 is configured to receive vertex data from IDX 402 and to transmit that vertex data to input buffer 408, which is configured to store vertex data received from IDX 402. Each of first output buffer 410, second output buffer 412 and nth output buffer 414 is configured to store processed vertex data received from vertex engine 416, as described in further detail herein.

Vertex engine 416 is the general computational engine underlying programmable geometry engine 400. As shown, vertex engine 416 may include, without limitation, a floating point processor 420, a memory 422 and a scheduler 418. Memory 422 is coupled to floating point processor 420 and memory controller 303 and is configured to store locally user-developed programs or subroutines to be executed by floating point processor 420.

Scheduler 418 is coupled to floating point processor 420 and each of the fixed function engines in programmable primitive engine 424 (e.g., first fixed function engine 426, second fixed function engine 430 and Nth fixed function engine 434 in FIG. 4). Scheduler 418 is configured to arbitrate access to floating point processor 420 among the different fixed function engines. In one embodiment, scheduler 418 is configured to determine which fixed function engines in programmable primitive engine 424 require relatively more processing support based on the content of a given set of primitive commands and the configuration of programmable primitive engine 424. Scheduler 418 is further configured to regulate when each fixed function engine in programmable primitive engine 424 is able to transmit a program command to floating point processor 420. These capabilities enable scheduler 418 to load balance among the various fixed function engines by allowing those fixed function engines requiring more processing support to transmit program commands to floating point processor 420 more frequently than those fixed function engines requiring less processing support. As persons skilled in the art will recognize, load balancing between the various fixed function engines may reduce bottlenecks in programmable primitive engine 424 caused by one or more fixed function engines having disproportionately greater processing needs than the other fixed function engines in programmable primitive engine 424.

Floating point processor 420 is configured to receive program commands transmitted to vertex engine 416 by any of the fixed function engines in programmable primitive engine 424 (e.g., first fixed function engine 426, second fixed function engine 430 and Nth fixed function engine 434). Floating point processor 420 is further configured to interpret and to execute each such program command. More specifically, upon receiving a given program command, floating point processor 420 is configured to retrieve the user-developed program or subroutine stored in graphics memory 308 at the memory location designated by the program pointer contained in the program command and to store that program or subroutine in memory 422. In one embodiment, floating point processor 420 accesses the user-developed program or subroutine via memory controller 303. Floating point processor 420 is further configured to retrieve the vertex data stored in vertex RAM 404 at the memory location(s) designated by the data pointer(s) contained in the program command (this vertex data is hereinafter referred to as the "source data").

After retrieving the source data, floating point processor 420 is configured to process the source data. As persons skilled in the art will understand, the instructions contained in the user-developed program or subroutine configure floating point processor 420 to perform specific operations on the source data, producing processed vertex data. Floating point processor 420 is configured to transmit this processed vertex data to vertex RAM 404 for storage. Finally, floating point processor 420 is configured to transmit the corresponding results to the fixed function engine in programmable primitive engine 424 that transmitted the program command to vertex engine 416, as previously described herein.

In one embodiment, for a given set of program commands transmitted by a specific fixed function engine in programmable primitive engine 424, vertex data stored in input buffer 408 is the source data processed according to the first program command of that set. Floating point processor 420 is configured to transmit the corresponding processed vertex data to first output buffer 410 for storage. This vertex data stored in output buffer 410 then becomes the source data processed according to the second program command of the set of transmitted program commands. Floating point processor 420 is configured to transmit the corresponding processed vertex data to second output buffer 412 for storage. This vertex data stored in second output buffer 412 then becomes the source data processed according to the third program command of the set of transmitted program commands. Floating point processor 420 is configured to repeat this pattern of retrieving vertex data from and transmitting processed vertex data to the various output buffers of vertex RAM 406 until floating point processor 420 has processed all of the program commands in the set of transmitted program commands.

In alternative embodiments, floating point processor 420 may retrieve vertex data from and transmit processed vertex data to the different memory buffers of vertex RAM 404 in any technically feasible fashion. Further, vertex allocator 406, input buffer 408 and the various output buffers (e.g., first output buffer 410, second output buffer 412 and nth output buffer 414) may be configure in any manner so long as vertex RAM 404 functions as intended. Persons skilled in the art will therefore recognize that neither the manner in which floating point processor 420 retrieves vertex data from or transmits processed vertex data to vertex RAM 404 nor the configuration of vertex RAM 404 in any way limits the scope of the invention.

In alternative embodiments, vertex engine 416 also may be configured to perform vertex shading operations. For example, in an alternative embodiment, IDX 402 may be configured to transmit vertex data to vertex engine 416 for vertex shading operations prior to transmitting that vertex data to vertex RAM 404. In such a situation, floating point processor 420 may execute one or more user-developed or other vertex programs to process the vertex data. These vertex programs reside in graphics memory 308 and may be accessed by floating point processor 420 via memory controller 303. In other alternative embodiments, vertex engine 416 may perform vertex shading operations on vertex data residing in vertex RAM 404 between processing different sets of program commands transmitted by the various fixed function engines in programmable primitive engine 424. For example, in one alternative embodiment, vertex engine 416 may be configured to perform vertex shading operations after processing a set of program commands transmitted by first fixed function engine 426 but before processing a set of program commands transmitted by second fixed function engine 430. In yet another alternative embodiment, vertex engine 416 may be configured to perform vertex shading operations each time vertex engine 416 finishes processing a set of program commands transmitted by any of the fixed function engines in programmable primitive engine 424.

In addition, in alternative embodiments, programmable geometry engine 400 may be configured with any number of vertex engines 416. For example, if programmable primitive engine 424 includes three fixed function engines, one of which requires far greater processing support than the other two, programmable geometry engine 400 may include two vertex engines 416. One vertex engine 416 may be configured to process program commands transmitted by the fixed function engine requiring greater processing support, and the other vertex engine 416 may be configured to process program commands transmitted by the other two fixed function engines. In another alternative embodiment, programmable geometry engine 400 may include one vertex engine 416 for each fixed function engine in programmable primitive engine 424. Persons skilled in the art will recognize that programmable geometry engine 400 may be configured with any combination of vertex engines 416 and fixed function engines in programmable primitive engine 424 and that, therefore, the number of vertex engines 416 in no way limits the scope of the invention. In addition, persons skilled in the art will understand that in embodiments including more than one vertex engine 416, vertex allocator 406 may be configured to arbitrate access to vertex data stored in vertex RAM 404 such that two or more vertex engines 416 may not simultaneously access the same vertex data for processing.

As FIG. 4 also shows, programmable geometry engine 400 may include a viewport/set-up unit 450 and a rasterization unit 452. Viewport/set-up unit 450 is configured to access vertex data from vertex RAM 404 and to perform viewport transformations, viewport clipping, matrix translation to screen space, and the like, as well as triangle or primitive set-up, derivative computations, culling and the like. Rasterization unit 452 is configured to receive processed vertex data transmitted by viewport/set-up unit 450 and to convert the vertex data to pixel fragments.

As persons skilled in the art will recognize, the general functionality of programmable geometry engine 400 enables users to influence a variety of computational parameters and metrics that determine how a graphics processor, such as graphics processor 302, actually generates primitives in the graphics pipeline (e.g., graphics pipeline 200). Users exert such influence by writing the user-developed programs and subroutines that vertex engine 416 executes to calculate the various computational parameters and metrics (as well as to generate vertices for both processed and newly-generated primitives). Further, as these calculations are performed on a primitive-by-primitive or a vertex-by-vertex basis, users have influence over the local decisions that determine how primitives are generated in the graphics pipeline (e.g., graphics pipeline 200).

For example, a user may write a tessellation program with two subroutines, an initialization subroutine and an evaluation subroutine. The initialization subroutine may be responsible for calculating the LOD of the mesh, and the evaluation subroutine may be responsible for generating the vertices of the primitives in the mesh. Programmable geometry engine 400 may be configured such that one of the fixed function engines in programmable primitive engine 424 transmits to vertex engine 416 program commands that call on the two subroutines of this tessellation program when tessellation needs to be performed over a given region of an object. First, vertex engine 416 may execute the initialization subroutine to calculate the LOD of the mesh, and then vertex engine 416 may execute the evaluation subroutine several times over to generate the requisite number of vertices for the mesh. As the user may write the algorithm(s) used to calculate the LOD of the mesh, the user may influence how densely the tessellated region is populated with primitives. Further, as one of the fixed function engines in programmable primitive engine 424 may be configured to call this tessellation program for every primitive transmitted to programmable geometry engine 400, the user may influence the level of tessellation over various regions on a primitive-by-primitive basis.

Figure 5:
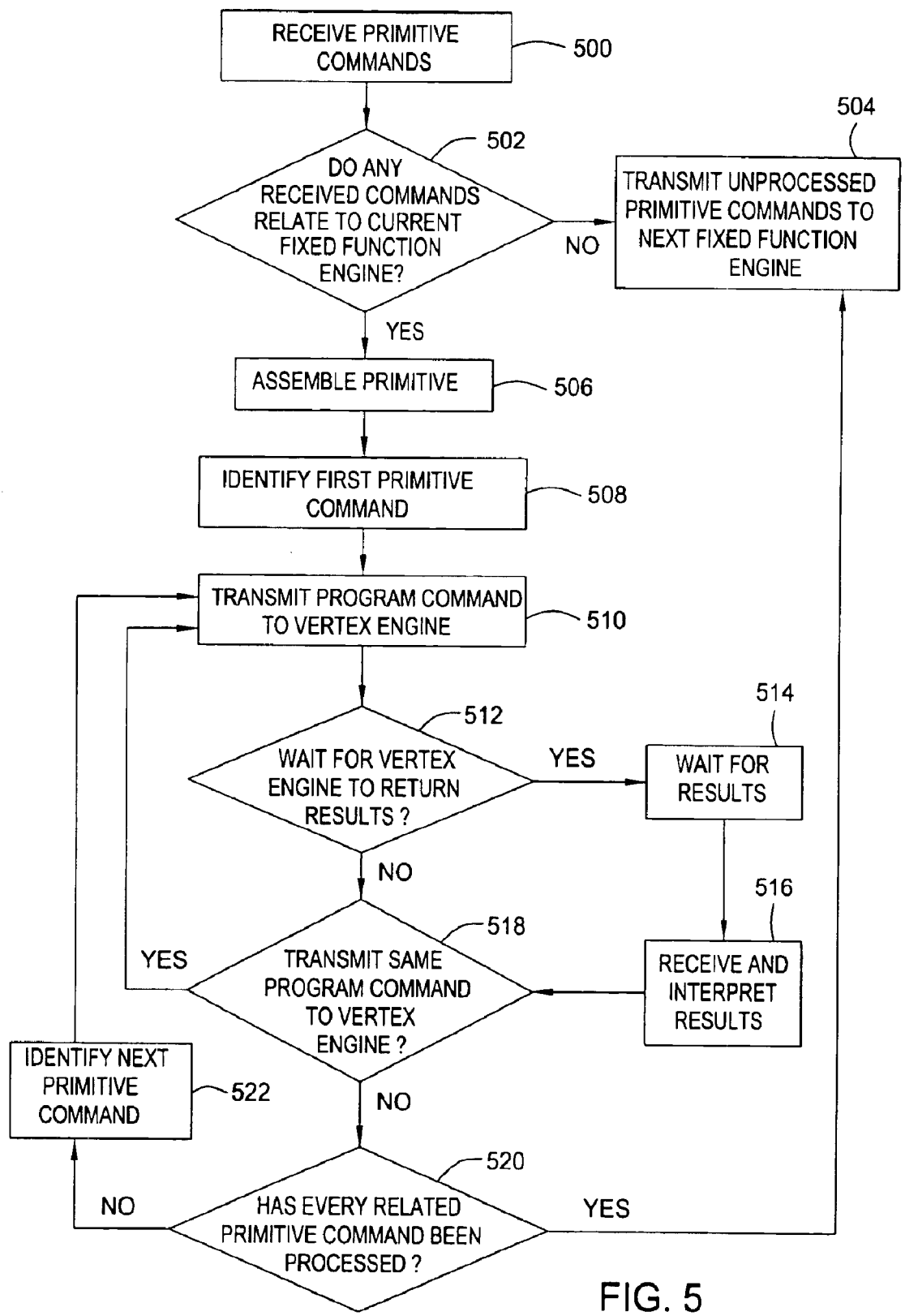
FIG. 5 is a flow chart of method steps for processing a set of primitive commands, according to one embodiment of the invention.

FIG. 5 is a flow chart of method steps for processing a set of primitive commands, according to one embodiment of the invention. Although the method steps are described in the context of the systems illustrated in FIGS. 1–4, any system configured to perform the method steps in any order is within the scope of the invention.

As FIG. 5 shows, the method of processing a set of primitive commands starts at step 500 where a fixed function engine in programmable primitive engine 424, such as any of first fixed function engine 426, second fixed function engine 430 or Nth fixed function engine 434, receives a series of primitive commands. In step 502, the fixed function engine determines whether any of the received primitive commands are related primitive commands—meaning, as previously described herein, that the fixed function engine determines whether it is supposed to process any of the received primitive commands. As previously described herein, in one embodiment, each primitive command includes one or more flags, each flag corresponding to a different fixed function engine in programmable primitive engine 424. For a given primitive command, each of the one or more flags is either enabled or disabled, thereby indicating whether the fixed function engine corresponding to a particular flag should process the primitive command. If the fixed function engine determines that none of the received primitive commands are related primitive commands, then the method proceeds to step 504 where the fixed function engine transmits the unprocessed received primitive commands to the next fixed function engine in programmable primitive engine 424. If, however, the fixed function engine determines that at least one of the received primitive commands is a related primitive command, then the method proceeds to step 506.

In step 506, the fixed function engine attempts to assemble a primitive using the vertex index information contained in the related primitive commands that have already been received. Being able to assemble the primitive confirms that the fixed function engine has received the index information for each vertex of the current primitive as well as a complete set of related primitive commands. If the fixed function engine is not able to assemble a primitive, then the fixed function engine has not yet received the complete set of related primitive commands. In the latter case, the fixed function engine waits to receive additional related primitive commands and then attempts to assemble a primitive again. The fixed function engine repeats the process of waiting for additional related primitive commands and attempting to assemble a primitive until it is able to assemble a primitive (thereby indicating that the fixed function engine has received the complete set of related primitive commands). Once the fixed function engine is able to assemble the primitive, then the method proceeds to step 508.

In step 508, the fixed function engine identifies the first primitive command in the set of related primitive commands to be processed. In step 510, the fixed function engine generates a program command corresponding to the first primitive command and transmits that program command to vertex engine 416 for processing. In step 512, the fixed function engine determines whether to wait until vertex engine 416 returns the corresponding results: before sending another program command to vertex engine 416 for processing. As previously described herein, the fixed function engine may make this determination from, for example, instructions included in the primitive command or program command currently being processed or from information included in results received from vertex engine 416 that correspond to a previously processed program command.

If the fixed function engine determines that it should not wait for vertex engine 416 to return the corresponding results, the method proceeds to step 518. If, however, the fixed function engine determines that it should wait for vertex engine 416 to return the corresponding results, then the method instead proceeds to step 514. In step 514, the fixed function engine waits for vertex engine 416 to process the program command and to return the corresponding results. In step 516, the fixed function engine receives the results from vertex engine 416 and interprets those results, and the method then proceeds to step 518.

In step 518, the fixed function engine determines whether it should transmit the same program command again to vertex engine 416 for processing. Again, as described previously herein, the fixed function engine may make this determination from, for example, instructions included in the primitive command or program command currently being processed or from information included in results received from vertex engine 416 that correspond to a previously processed program command. If the fixed function engine determines that it should transmit the same program command to vertex engine 416, then the method returns to step 510. If, however, the fixed function engine determines that it should not transmit the same program command to vertex engine 416, then the method instead proceeds to step 520.

In step 520, the fixed function engine determines whether all primitive commands in the set of related primitive commands have been processed. If all related primitive commands have been processed, then the method returns to step 504 where the fixed function engine transmits all received primitive commands that remain unprocessed to the next fixed function engine in programmable primitive engine 424. If, however, all related primitive commands have not been processed, then the method instead proceeds to step 522. In step 522, the fixed function engine identifies the next primitive command in the set of related primitive commands to be processed, and the method returns to step 510.

Figure 6:
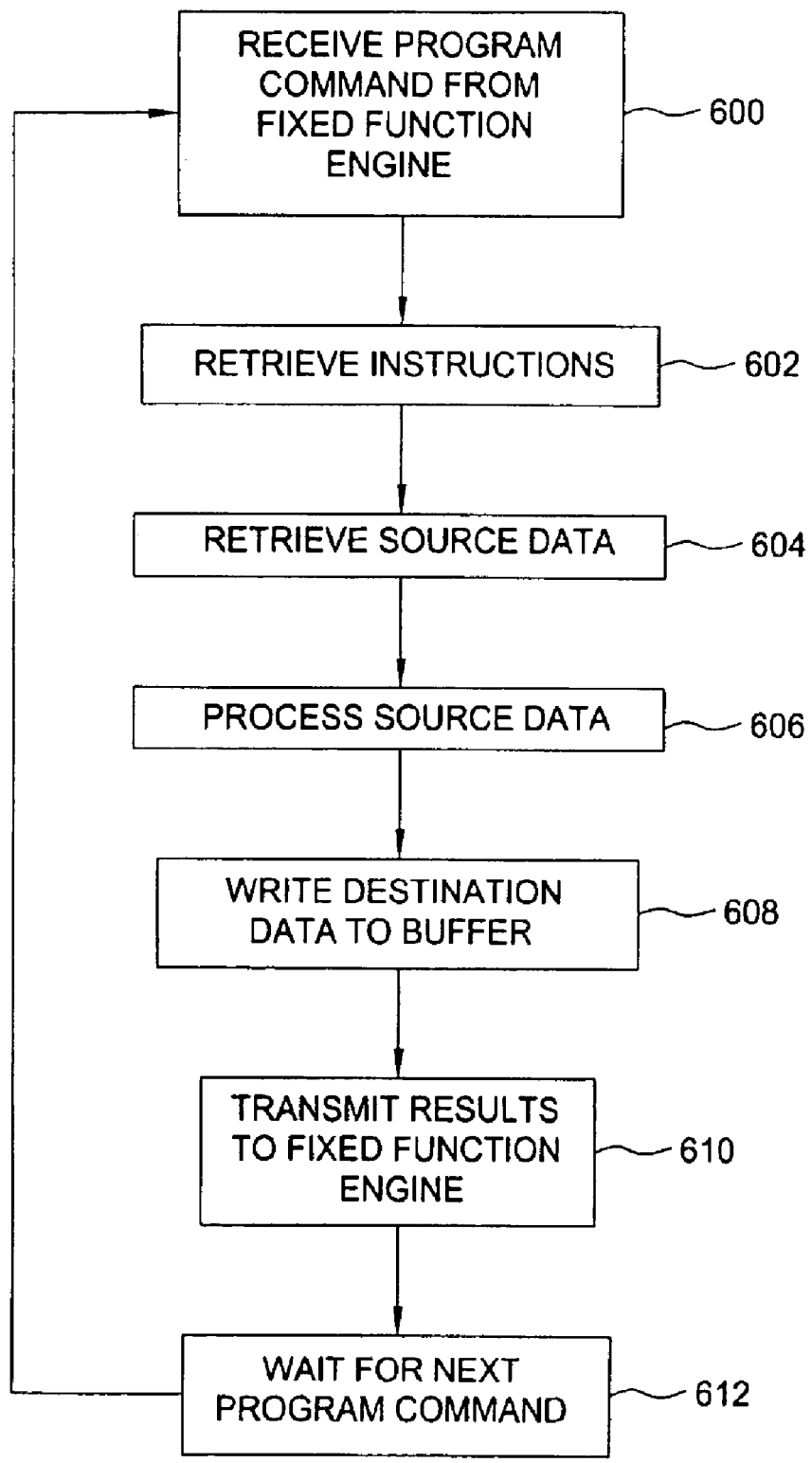
FIG. 6 is a flow chart of method steps for processing a program command, according to one embodiment of the invention.

FIG. 6 is a flow chart of method steps for processing a program command, according to one embodiment of the invention. Although the method steps are described in the context of the systems illustrated in FIGS. 1–4, any system configured to perform the method steps in any order is within the scope of the invention.

As shown in FIG. 6, the method of processing a primitive command starts at step 600 where floating point processor 420 in vertex engine 416 receives a program command transmitted by one of the fixed function blocks in programmable primitive engine 424, such as any of first fixed function engine 426, second fixed function engine 430 or Nth fixed function engine 434. In step 602, floating point processor 420 retrieves the user-developed program or subroutine stored in graphics memory 308 at the memory location designated by the program pointer contained in the program command. Floating point processor 420 stores this program or subroutine in memory 422. In step 604, floating point processor 420 retrieves source data stored in vertex RAM 404 at the memory location(s) designated by the data pointer(s) contained in the program command.

In step 606, floating point processor processes the source data. The instructions contained in the user-developed program or subroutine stored in memory 422 configure floating point processor 420 to perform specific operations on the source data, producing processed vertex data. In step 608, floating point processor 420 transmits the processed vertex data to one of the output buffers in vertex RAM 404, such as first output buffer 410, second output buffer 412 or nth output buffer 414, for storage. In step 610, floating point processor 420 transmits the corresponding results back to the fixed function engine in programmable primitive engine 424 that transmitted the program command to vertex engine 416. In step 612, floating point processor 420 waits to receive the next program command from one of the fixed function engines in programmable primitive engine 424. The method then returns to step 600.

Figure 7:
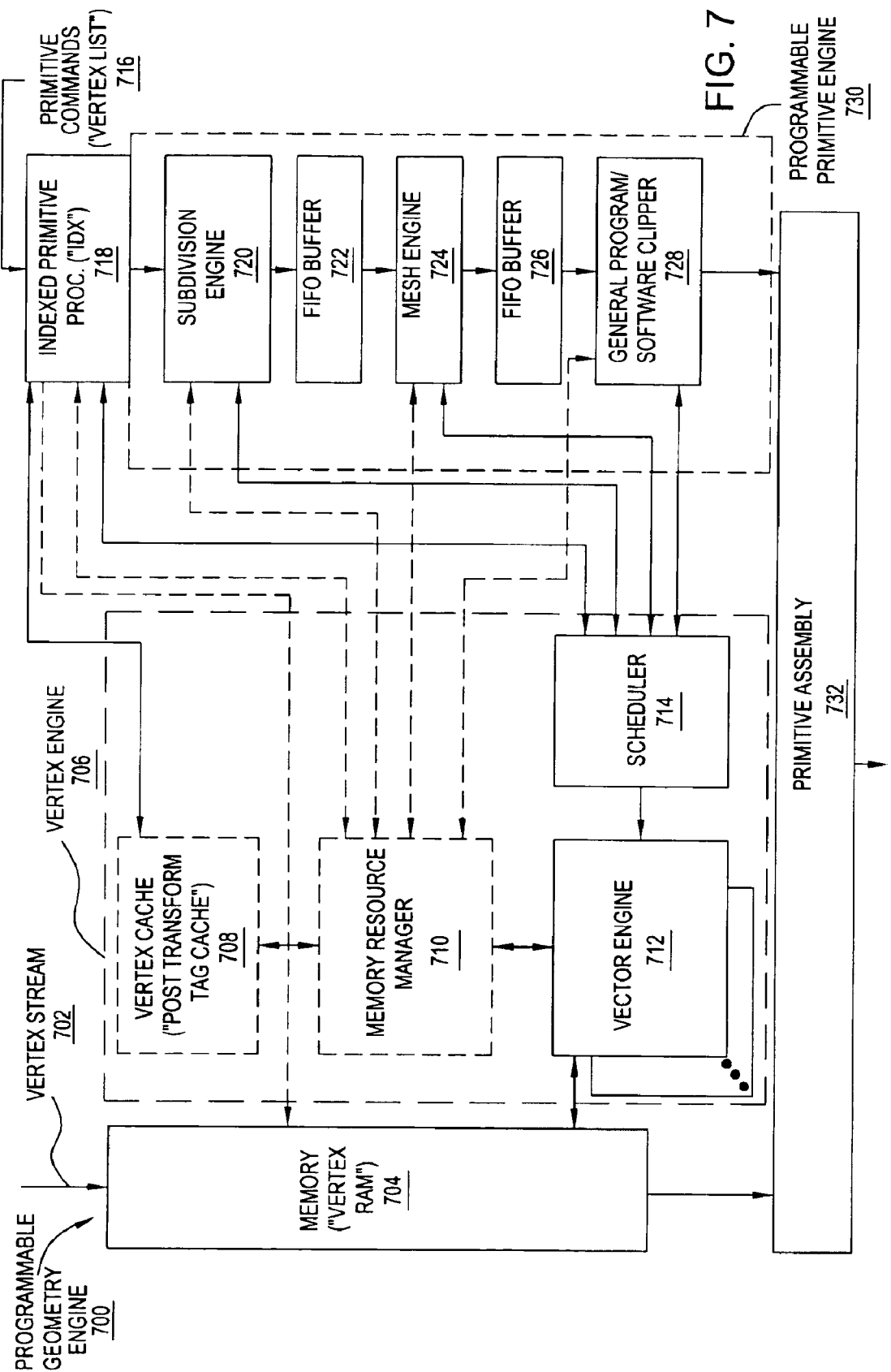
FIG. 7 is a functional block diagram illustrating a programmable geometry engine, according to an alternative embodiment of the invention.

FIG. 7 is a functional block diagram illustrating a programmable geometry engine 700, according to an alternative embodiment of the invention. As shown, programmable geometry engine 700 includes, without limitation, an IDX 718, a vertex RAM 704, a vertex engine 706, a programmable primitive engine 730 and a primitive assembly unit 732.

As previously described herein, IDX 718 obtains primitive commands from a graphics memory such as graphics memory 308 (not shown). These primitive commands include a "vertex list" for at least one primitive. This vertex list includes vertices for such a primitive as well as indices for obtaining vertex data from vertex cache 708, if available, or from vertex RAM 704. The vertex list also may include indices for obtaining vertex data for neighbors and/or edge data. Vertex streams are provided to vertex RAM 704. Vertex streams include vertex data obtained from a graphics memory such as graphics memory 308.

Vertex RAM 704 is configured similarly to vertex RAM 404 of FIG. 4 and is for storing both vertex data obtained from the graphics memory and processed vertex data output by vertex engine 706. As vertex RAM 704 is a shared resource, a memory resource manager 710 manages access to vertex RAM 704 by the different elements of programmable geometry engine 700 such as IDX 718, vertex engine 706 and the different fixed function engines in programmable primitive engine 730. In addition, as persons skilled in the art will recognize, vertex RAM 704 includes a memory controller, such as memory controller 303, through which vertex engine 706 accesses user-developed programs or subroutines for primitive processing operations (as specified by the program commands received from programmable primitive engine 730) as well as programs or subroutines for vertex shading operations.

Vertex engine 706 includes a vertex cache 708, memory resource manager 710, one or more vector engines 712 and a scheduler 714. Vertex engine 706 is configured to function in the same general manner as vertex engine 416, as described above in conjunction with FIG. 4.

Programmable primitive engine 730 includes three fixed function engines, a subdivision engine 720, a mesh engine 724 and a general program/software clipper 728, each of which is configured to enable programmable geometry engine 700 to implement a specific user-programmed function as described in further detail herein. Programmable primitive engine 730 also includes a FIFO buffer 722, which is coupled to subdivision engine 720 and mesh engine 724, and a FIFO buffer 726, which is coupled to mesh engine 724 and general program/software clipper 728.

Primitive assembly unit 732 has similar functionality to that of viewport/set-up unit 450 of FIG. 4. Primitive assembly unit 732 is therefore configured to perform viewport transformations, viewport clipping, matrix translation to screen space, and the like, as well as triangle or primitive set-up, derivative computations, culling and the like.

As FIG. 7 also shows, programmable primitive engine 730 may be configured to implement all or part of a programming model that includes four different types of user-developed primitive programs. The four types of primitive programs are a single-vertex or transform program, a subdivision program suite, a mesh program suite and a general program. As previously described herein, each of the fixed function engines in programmable primitive engine 730 may be configured to cause vertex engine 706 to perform primitive processing operations using one of the four types of user-developed primitive programs. In the embodiment of FIG. 7, subdivision engine 720 is configured to cause vertex engine 706 to perform primitive processing operations using the suite of user-developed subdivision programs, mesh engine 724 is configured to cause vertex engine 706 to perform primitive processing operations using the suite of user-developed mesh programs, and general program/software clipper 728 is configured to cause vertex engine 706 to perform primitive processing operations using the user-developed general program.

The single-vertex or transform program accepts one vertex as input and produces one vertex as output. Single-vertex programs may be used for transformation and per-vertex lighting setup. Single-vertex programs may be used in conjunction with other program types, but the single-vertex program typically is run prior to providing vertices to either subdivision, mesh or general programs.

The subdivision program suite includes six programs (or subroutines) that are used to subdivide one or more primitives. The six programs are an edge test program, a limit point program, a face control point program, an edge control point program, a vertex control point refinement program and edge data refinement program.

The edge test program is used to determine if an edge should be subdivided or further subdivided. For example, if the program computes an edge value greater than 1.0 for a particular edge, then that edge is divided and each resulting subdivision is subject to possible additional subdivision. If the program computes an edge value less than or equal to 1.0 for the edge, then the edge is not divided. The edge test program may have access to control points of the edge being tested and may be able to access one-ring neighbors of those control points. Further, the edge test program may have access to the limit points of the endpoints of the edge being tested but not to the one-ring neighbors of those limit points.

The limit point program typically is used to calculate a limit point (i.e., the final position of a vertex) from a control point and the one-ring neighbors of that control point.

The face control point program is used to determine a new control point in the center of a face of a primitive. The face control point program typically is used only in quad subdivision schemes. In many instances, the new control point is simply the average of the four vertices of the face of the quad at issue.

The edge control point program typically is used to determine a new control point in the center of an edge.

The vertex control point refinement program is used to refine a control point prior to instituting the next level of subdivision. The control point at the current subdivision level corresponding to the refined control point and the neighbors of the control point at the current subdivision level may be used as inputs to vertex control point refinement program.

The edge data refinement program is used to determine edge data for the two new edges created when an edge having edge data is subdivided. The inputs to the edge data refinement program are the control points of the edge prior to being subdivided and the original edge data of that edge. The edge data refinement program computes new edge data for the new edge connecting vertex 0 to the new edge control point. The edge data refinement program typically is executed twice, once for each new edge, with the vertices being swapped the second time the program is executed.

The mesh program suite includes three programs used for tessellation. The three programs are a mesh global constants evaluation program, an adaptive mesh density program and a mesh points evaluation program.

The mesh global constants evaluation program is used to perform certain up-front tessellation-related computations, such as calculating Bezier control points for NPatches. This program typically is executed once per primitive prior to evaluating any sample points. Primitive data are the inputs to the mesh global constants evaluation program, and the output is a single vertex. The data in this single vertex may be made available to the mesh points evaluation program.

The adaptive mesh density program is used to compute the integer or fractional tessellation values for the sides of a primitive. This program enables adaptive tessellation and typically is executed once per primitive prior to evaluating any sample points. Primitive data are the inputs to the adaptive mesh density program, and the output is a single vector.

The mesh points evaluation program is used to evaluate a single position on a mesh. The inputs to this program are primitive data, the output of the global constants evaluation program and a position, (u,v) or (u,v,w), in parametric space, and the output is a single vertex.

Finally, the general program is used to arbitrarily generate primitives of a single type. The inputs to this program are the primitive data, and the outputs are streams of vertices of arbitrary length. The output type may be any type of primitive, including strips or fans of that type of primitive. Further, the general program may be executed using the primitives generated by the mesh and subdivision programs.

One advantage of the disclosed fixed function engine (e.g., first fixed function engine 426) is that it enables programmable geometry engine 400 to be configured to implement specific user-programmed functions. This functionality provides users with the ability to influence a variety of computational parameters and metrics that determine how a graphics processor (e.g., graphics processor 302) actually generates primitives in the graphics pipeline (e.g. graphics pipeline 200). Another advantage is that the disclosed fixed function engine provides programmable geometry engine 400 with the flexibility to perform vertex operations before and/or after primitive operations. Such flexibility in the architecture enables matrix palette skinning to be performed after tessellation, if so desired. In addition, programmable geometry engine 400 that includes multiple fixed function engines may be configured with scheduler 418 that arbitrates access to one or more vertex engines 416 among the different fixed function engines. Scheduler 418 may be configured to load balance among the different fixed function engines by allowing a fixed function engine with greater processing needs to transmit program commands to vertex engine(s) 416 more frequently than those fixed function engines requiring less processing support. Such load balancing may reduce bottlenecks in the graphics pipeline.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A programmable geometry engine, the programmable geometry engine comprising:
   a programmable primitive engine configured to receive primitive commands, the primitive commands including information for processing vertex data using user-developed programs or subroutines, and to transmit program commands, each program command including a program pointer and a data pointer; and
   a processing engine configured to receive the program commands, to retrieve the user-developed programs or subroutines using the program pointers and to retrieve vertex data using the data pointers, to process the vertex data based on instructions included in the user-developed programs or subroutines, producing processed vertex data, and to transmit results to the programmable primitive engine.

2. The programmable geometry engine of claim 1, further comprising a storage resource configured to store vertex data and processed vertex data.

3. The programmable geometry engine of claim 2, further comprising an indexed primitive processor configured to transmit vertex data to the storage resource and the primitive commands to the programmable primitive engine.

4. The programmable geometry engine of claim 3, wherein the storage resource includes a first memory buffer for storing vertex data transmitted by the indexed primitive processor and a second memory buffer for storing processed vertex data transmitted by the processing engine.

5. The programmable geometry engine of claim 1, wherein the programmable primitive engine comprises a first fixed function engine and a second fixed function engine, the first fixed function engine configured to receive a first primitive command and to transmit a first program command, the first program command including a first program pointer and a first data pointer, the second fixed function engine configured to receive a second primitive command and to transmit a second program command, the second program command including a second program pointer and a second data pointer.

6. The programmable geometry engine of claim 5, wherein the second fixed function engine receives the second primitive command from the first fixed function engine.

7. The programmable geometry engine of claim 5, wherein the processing engine comprises a floating point processor and a scheduler.

8. The programmable geometry engine of claim 7, wherein the floating point processor is configured (a) to receive the first program command, to retrieve a first user-developed program or subroutine using the first program pointer and first vertex data using the first data pointer, to process the first vertex data based on instructions included in the first user-developed program or subroutine and to transmit first results to the first fixed function engine and (b) to receive the second program command, to retrieve a second user-developed program or subroutine using the second program pointer and second vertex data using the second data pointer, to process the second vertex data based on instructions included in the second user-developed program or subroutine and to transmit second results to the second fixed function engine.

9. The programmable geometry engine of claim 8, wherein the scheduler is configured to arbitrate access to the floating point processor between the first fixed function engine and the second fixed function engine.

10. The programmable geometry engine of claim 8, wherein the first user-developed program or subroutine relates to primitive subdivision.

11. The programmable geometry engine of claim 8, wherein the first user-developed program or subroutine relates to tessellation.

12. The programmable geometry engine of claim 8, wherein the first user-developed program or subroutine relates to generating a vertex stream.

13. The programmable geometry engine of claim 8, wherein the second user-developed program or subroutine relates to generating a vertex stream.

14. The programmable geometry engine of claim 1, wherein the programmable geometry engine resides in a graphics processor.

15. A programmable primitive engine, the programmable primitive engine comprising:
 a first fixed function engine, the first fixed function engine configured to receive a first primitive command and to transmit a first program command to a processing engine, the first program command including a first program pointer and a first data pointer; and
 a second fixed function engine, the second fixed function engine configured to receive a second primitive command and to transmit a second program command to the processing engine, the second program command including a second program pointer and a second data pointer.

16. The programmable primitive engine of claim 15, wherein the second fixed function engine receives the second primitive command from the first fixed function engine.

17. The programmable primitive engine of claim 15, wherein the processing engine comprises a floating point processor and a scheduler.

18. The programmable primitive engine of claim 17, wherein the floating point processor is configured (a) to receive the first program command, to retrieve a first user-developed program or subroutine using the first program pointer and first vertex data using the first data pointer, to process the first vertex data based on instructions included in the first user-developed program or subroutine and to transmit first results to the first fixed function engine and (b) to receive the second program command, to retrieve a second user-developed program or subroutine using the second program pointer and second vertex data using the second data pointer, to process the second vertex data based on instructions included in the second user-developed program or subroutine and to transmit second results to the second fixed function engine.

19. The programmable primitive engine of claim 18, wherein the scheduler is configured to arbitrate access to the floating point processor between the first fixed function engine and the second fixed function engine.

20. The programmable primitive of claim 18, wherein the first user-developed program or subroutine relates to primitive subdivision.

21. The programmable primitive engine of claim 18, wherein the first user-developed program or subroutine relates to tessellation.

22. The programmable primitive engine of claim 18, wherein the first user-developed program or subroutine relates to generating a vertex stream.

23. The programmable primitive engine of claim 15, wherein the programmable primitive engine resides in a graphics processor.

24. A programmable geometry engine, the programmable geometry engine comprising:
 means for receiving one or more primitive commands, each primitive command including information for processing vertex data using a user-developed program or subroutine;
 means for determining a set of related primitive commands from the one or more primitive commands;
 means for identifying a first primitive command for processing, the first primitive command being a primitive command in the set of related primitive commands;
 means for transmitting a first program command for processing, the first program command corresponding to the first primitive command and including a program pointer and a data pointer; and
 means for performing specific operations on the source data based on instructions contained in the user-developed program or subroutine to produce processed vertex data.

25. The programmable geometry engine of claim 24, wherein the programmable geometry engine resides in a graphics processor.

* * * * *